J. K. LANDIS.
Straw Cutter.
No. 19,935.
Patented April 13, 1858.
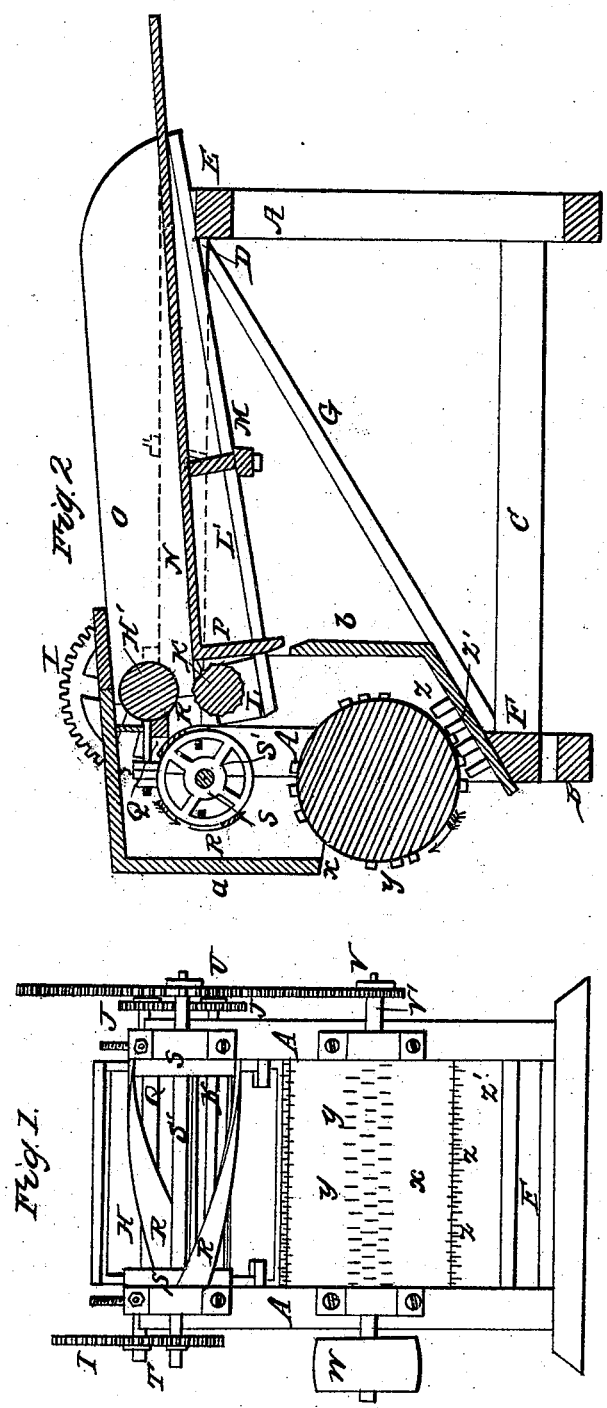

UNITED STATES PATENT OFFICE.

JOHN K. LANDIS, OF LANCASTER, PENNSYLVANIA.

IMPROVEMENT IN STRAW-CUTTERS.

Specification forming part of Letters Patent No. 19,935, dated April 13, 1858.

*To all whom it may concern:*

Be it known that I, JOHN K. LANDIS, of Lancaster, in the county of Lancaster and State of Pennsylvania, have invented certain new and useful Improvements in Machines for Cutting Straw, Corn-Fodder, &c.; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 1 is an elevation of the front end of a straw-cutter with my improvements without the front and top casing. Fig. 2 is a sectional elevation of Fig. 1 cut perpendicularly through the center.

The nature of my improvements consists in a yielding bed or bottom in the feeding-trough connected to the lower feeding-roller so as to be depressed by or with it as it is forced down by the material fed into the machine; also, in combining with the apparatus that cuts the fodder a rotary cutting apparatus to cut it still finer.

In the accompanying drawings, A A are posts framed into the cross-sills B B and connected together by the bottom bars C and top bars D and by the cross-bars E and F and braced by the braces G, making a strong frame, to which the other parts are fastened or connected. H is the top feeding-roller, with its journals fitted to turn in boxes H', fastened to the top of the bars D, and has the gear I fastened at one end, by which it is turned, and the gear J at the other end to turn the gear J', and the lower feeding-roller K, which is fluted and arranged to turn in the boxes L, fastened to the springs L'. The middle of these springs rests on the bar M, which is suspended by screw-bolts from the top bars D, as shown in the drawings, so that they may be adjusted as desired to press the under feed-roll up with greater or less force, as may be required. The rear ends of the springs L' are fastened to the bar E, as shown in the drawings.

The bottom N of the feed-box is arranged to vibrate freely between the sides O, and it rests on the bar M, and is fastened to the piece P, which connects it to the springs L', so that when the fodder fed into the machine depresses the lower feeding-roller K the bottom N yields and is depressed with and by it, so as to always maintain the same relative position to the roller shown in the drawings. This is a great advantage, as it facilitates the delivering of the fodder to the feeding-rollers and relieves the bottom of the trough from a great portion of the friction to which it would be subjected if it were permanently fixed so as not to be depressed with and by the roller as it is forced down by the material fed to the rollers. As the fodder leaves the rollers it passes under the bar Q, fastened to the top bars D, against which it is cut by the revolving knives R R, arranged spirally and fastened to the pulleys S on the shaft S', which turns in boxes fastened to the posts A. The shaft S' has a pinion T fastened to one end to turn the gear I and roller H, and the large gear U, fastened to the other end, which is turned by the pinion V on the shaft V', which shaft turns in boxes fastened to the posts A and has the pulley W fastened to it for a band to operate the machine. The shaft V' has the cylinder X fastened to it, which cylinder is armed with a series of sharp teeth Y Y, which act in connection with the teeth Z Z on the inclined bottom board Z' to cut the fodder still finer after it has been cut by the knives R, from which knives the fodder falls down onto the cylinder X, as it is confined by the front casing *a* and back casing *b*. (Shown in Fig. 2 of the drawings.)

I believe I have described and represented my improvements in machines for cutting straw, corn-fodder, &c., so as to enable any person skilled in the art to make and use them. I will now state what I desire to secure by Letters Patent.

I claim—

1. A yielding bed or bottom in the feeding trough or box connected to and depressed by the lower feeding-roller as it is forced down by the material fed into the machine, substantially as described.

2. In combination with the above, the rotary cutting apparatus arranged to receive the fodder cut and cut it still finer, substantially as described.

JOHN K. LANDIS.

Witnesses:
 I. DENNIS, Jr.,
 EDW. F. BROWN.